United States Patent [19]
Fleytman

[11] Patent Number: 6,098,480
[45] Date of Patent: Aug. 8, 2000

[54] WORM GEAR ASSEMBLY FOR DRIVE AXLE

[75] Inventor: Yakov Fleytman, Lake Orion, Mich.

[73] Assignee: Meritor Heavy Vehicle Systems, L.L.C., Troy, Mich.

[21] Appl. No.: 09/164,695

[22] Filed: Oct. 1, 1998

(Under 37 CFR 1.47)

Related U.S. Application Data

[60] Provisional application No. 60/070,015, Dec. 30, 1997.

[51] Int. Cl.[7] .............................. F16H 55/22; F16H 1/16
[52] U.S. Cl. ................................. 74/425; 74/424; 74/458
[58] Field of Search .............................. 74/425, 424, 457, 74/458

[56] References Cited

U.S. PATENT DOCUMENTS

| 1,322,392 | 11/1919 | Atwood . |
| 1,683,163 | 9/1928 | Cone . |
| 1,903,318 | 4/1933 | Wildhaber . |
| 1,980,237 | 11/1934 | Trbojevich . |
| 2,338,367 | 1/1944 | Trbojevich . |
| 2,935,886 | 5/1960 | Wildhaber . |
| 2,942,491 | 6/1960 | Wildhaber . |
| 3,213,700 | 10/1965 | Brownyer . |
| 3,768,326 | 10/1973 | Georgiev et al. . |
| 3,895,700 | 7/1975 | Kerr . |

OTHER PUBLICATIONS

P. 51, *Software Strategies*, Mar. 1996.
Definition of Worm Gearing, Section 8–102 of *Design Standards*.
"Theoretical and Experimental Investigation of a New Plane Toothed Wheel and Its Enveloping Hourglass Worm" by K. Ishida, H. Ueda, S. Ohashi and Y. Fukui; Transactions of the ASME, vol. 100, Jul. 1978 Pg. 460–469.

*Primary Examiner*—David A. Bucci
*Assistant Examiner*—William C Joyce
*Attorney, Agent, or Firm*—Howard & Howard

[57] ABSTRACT

A drive axle assembly for a vehicle receives input torque from an engine via an input shaft. The input shaft drives a worm which in turn drives a worm gear. The worm gear includes teeth which engage and drive an axle shaft which in turn drives a vehicle wheel. The teeth of the worm gear are defined by a tooth profile which has two pressure angles, one on each side of the tooth. The worm includes a thread with a thread profile that also has two pressure angles, one on each side of the thread. One of the pressure angles on the thread of the worm is greater than its other pressure angle and one of the pressure angles on the worm gear teeth is greater than its other pressure angle.

15 Claims, 3 Drawing Sheets

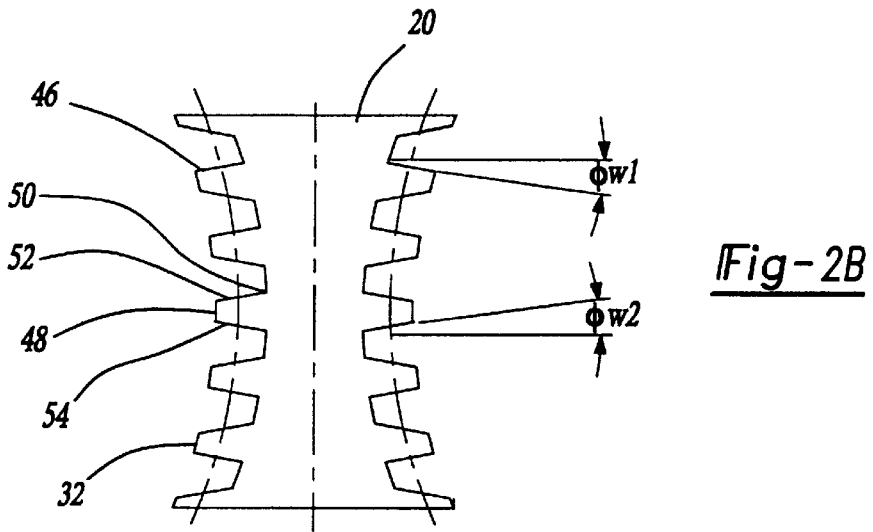
Fig-2B
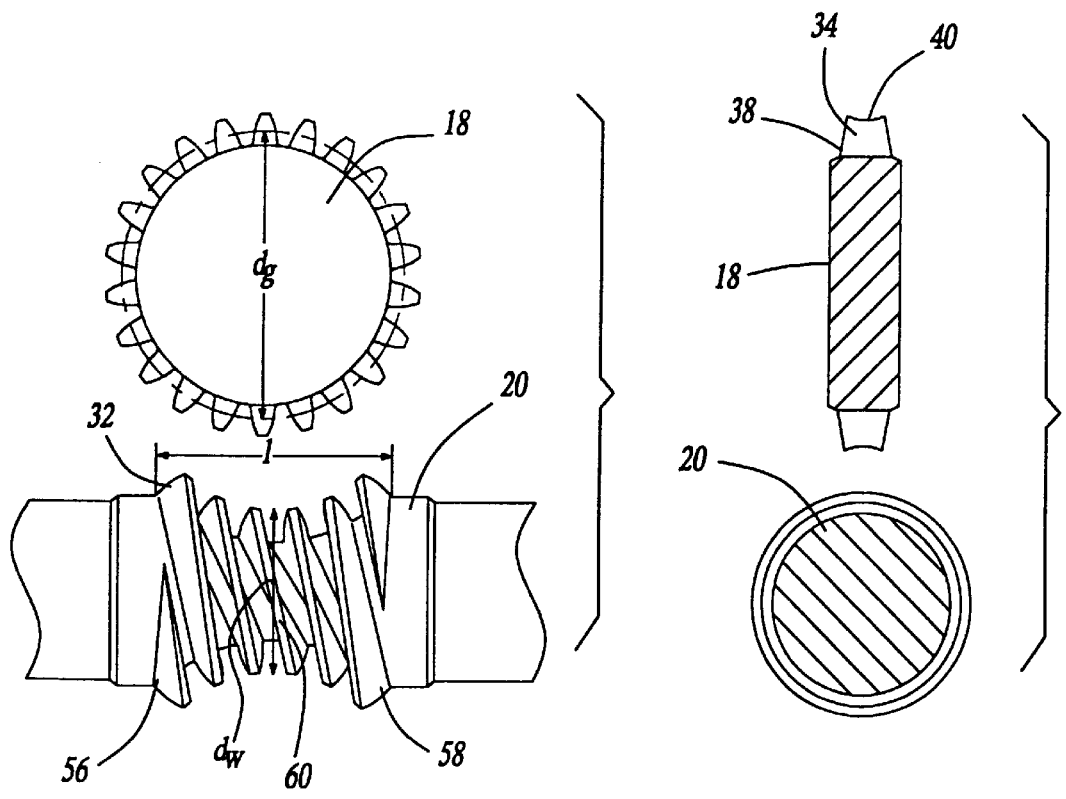
Fig-3A
Fig-3B

WORM GEAR ASSEMBLY FOR DRIVE AXLE

The present application claims the priority filing date of provisional patent application Ser. No. 60/070,015, filed Dec. 30, 1997.

BACKGROUND OF THE INVENTION

This invention relates to improvements made to a double enveloping worm gear assembly for use in a drive axle.

A typical drive axle assembly includes two wheels driven by axle shafts which are driven by a common differential. Usually, the differential utilizes standard hypoid gearing comprised of a pinion gear and a ring gear with the pinion gear receiving input from a driveshaft. However, other types of gearing such as cylindrical worm gearing have been used in drive axles.

A worm gear assembly includes a threaded worm having at least one thread defined by a thread profile and a worm gear having teeth defined by a tooth profile. For a single enveloping worm gear assembly the top surfaces of the worm gear teeth are curved such that they envelop the worm. For a double enveloping worm gear assembly, in addition to the worm gear teeth being curved, the threaded length of the worm is narrower at its mid-point than at its ends, i.e., it is cured along its threaded length, so that the worm envelops the worm gear.

The thread profile for the worm as used in either a single or double enveloping worm gear assembly has two sides, each having a pressure angle. The tooth profile for the worm gear also has two sides each having a pressure angle. The pressure angles of the tooth profile correspond to the respective pressure angles of the thread profile for proper meshing of the thread with the teeth as the worm drives the worm gear. Typically, these pressure angles are all equal to each other and usually have a standard value of twenty degrees.

Hypoid gearing is significantly more efficient than traditional worm gear assemblies, however, worm gear assemblies have improved packaging capabilities, are lighter, and quieter than typical hypoid gear assemblies. It would be desirable to increase the efficiency of a worm gear assembly without decreasing its other advantages over traditional hypoid gearing.

Hence, there is a need for a worm gear assembly which has improved efficiency and component life, is quieter, has higher torque handling capacity, improved weight savings, and which reduces effect of shock loading when compared to conventional worm and hypoid gear assemblies

SUMMARY OF THE INVENTION

A drive axle assembly for a vehicle receives input torque from an engine via an input shaft. The input shaft drives a worm which in turn drives a worm gear. The worm gear includes teeth which engage and drive an axle shaft which in turn drives a vehicle wheel. The teeth of the worm gear are defined by a tooth profile which has two pressure angles, one on each side of the tooth. The worm includes a thread with a thread profile that also has two pressure angles, one on each side of the thread. One of the pressure angles on the thread of the worm is greater than its other pressure angle and one of the pressure angles on the worm gear teeth is greater than the other pressure angle. This improves the component life for the worm gear assembly.

Most preferably, the worm gear assembly for a drive axle includes a worm gear which is rotatable about a first axis of rotation. The worm gear has teeth which are defined by a tooth profile having a first worm gear pressure angle and a second worm gear pressure angle. The first worm gear pressure angle exceeds the second worm gear pressure angle. The worm gear assembly also includes a worm for driving the worm gear and which defines a second axis of rotation which is substantially perpendicular to the first axis of rotation. The worm includes at least one thread having a worm thread profile with a first worm pressure angle and a second worm pressure angle. The first worm pressure angle exceeds the second worm pressure angle.

Accordingly, the subject invention presents a worm gear assembly which has improved efficiency and component life, is quieter, has higher torque handling capacity, improved weight savings and packing, and reduces effect of shock loading when compared to conventional worm and hypoid gear assemblies due to the unique configuration of the thread and tooth profiles.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2B is a thread profile for a worm;

FIG. 3A is a side view of a double enveloping worm gear assembly;

FIG. 3B is front view of the double enveloping worm gear assembly shown in FIG. 3A;

DETAILED DESCRIPTION OF THE PREFERRED EMBODIMENT

Figure 1A:
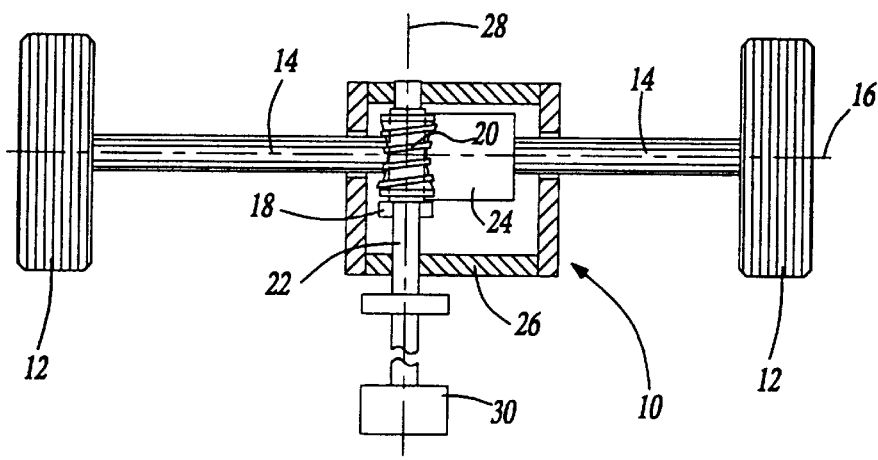
FIG. 1A is a partial cross-sectional top view of a drive axle assembly incorporating the subject worm gear assembly.

A drive axle assembly is generally shown at 10 in FIG. 1A. The drive axle assembly includes two (2) wheels 12 each driven by an axle shaft 14. The axle shafts 14 are substantially co-linear and define a first axis of rotation 16. A worm gear 18 is supported on one of the axle shafts 14 and is driven by a worm 20. The worm gear 18 is connected to a differential 24 which drives the other axle shaft 14 to rotate its respective wheel 12. The differential 24, the worm gear 18, and the worm 20 are all housed in a differential case 26.

The worm 20 receives input torque and rotational speed from an input or drive shaft 22. Torque from a vehicle engine 30 is transmitted to the worm 20 via this input shaft 22. The input shaft 22 defines a second axis of rotation 28 which is substantially perpendicular to the first axis of rotation 16. Thus, the input shaft 22 and the worm 20 both rotate about the second axis of rotation 28 while the worm gear 18 and the axle shafts 14 rotate about the first axis of rotation 16.

Figure 1B:
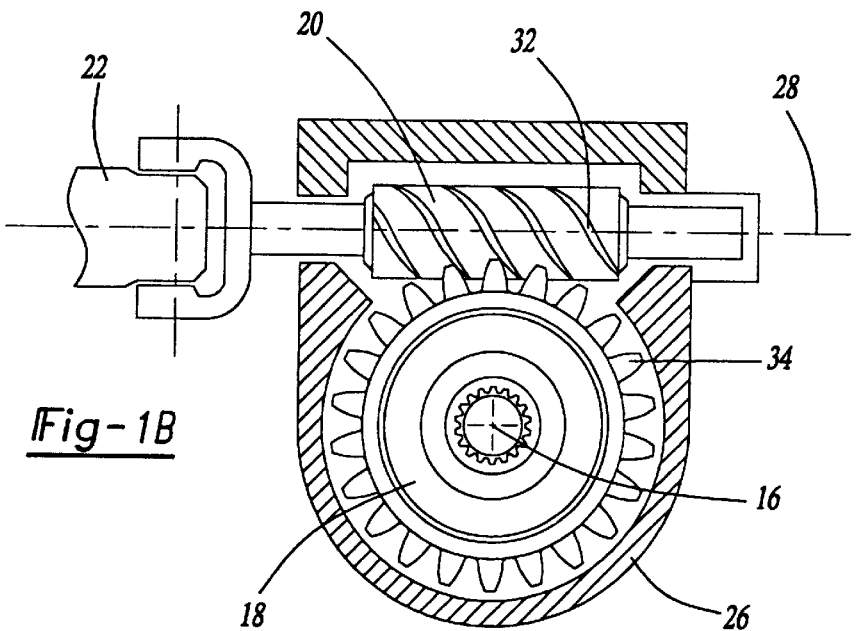
FIG. 1B is a partial cross-sectional side view of a drive axle assembly.

The worm 20 includes at least one thread 32, as shown in FIG. 1B, which extends along its length. The worm gear 18 has a plurality of teeth 34 which are engaged by the thread 32 as the worm 20 drives the worm gear 18.

Figure 2A:
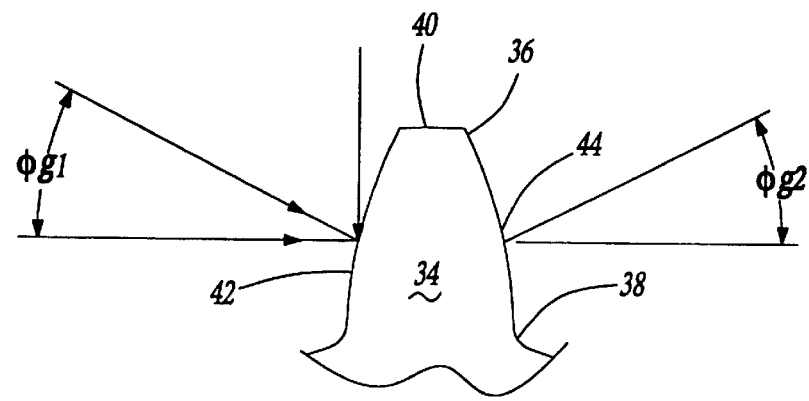
FIG. 2A is a tooth profile for a worm gear.

Each worm gear tooth 34 has a tooth profile 36, shown in FIG. 2A, which is an outline of the shape of the tooth 34. The tooth profile 36 includes a root base 38, a top surface 40, a drive side 42, and a coast side 44. Both the drive side 42 and the coast side 44 extend upwardly from the root base 38 to the top surface 40, thus forming a tooth 34. Typically, the drive side 42 of the gear tooth 34 receives loading while the coast side 44 does not.

The tooth 34 has a first worm gear pressure angle $\phi_{g1}$, located on the drive side 42, and a second worm gear pressure angle $\phi_{g2}$, located on the coast side 44. The first worm gear pressure angle $\phi_{g1}$ is greater than the second worm gear pressure angle $\phi_{g1}$. In one embodiment, the first worm gear pressure angle $\phi_{g1}$ is twice that of the second worm gear pressure angle $\phi_{g2}$, specifically, the first worm gear pressure angle $\phi_{g1}$ is sixty degrees and the second worm gear pressure angle $\phi_{g2}$ is 30 degrees. It should be understood that the first worm gear pressure angle $\phi_{g1}$ is not limited to being twice that of the second worm gear pressure angle $\phi_{g2}$, all that is necessary is that the first worm gear pressure angle $\phi_{g1}$ exceed the second worm gear pressure angle $\phi_{g2}$.

As shown in FIG. 2B, the thread 32 of the worm 20 has a thread profile 46 which is an outline of the shape of the thread 32. The thread profile 46 includes a top surface 48, a root surface 50, a first side surface 52, and a second side surface 54. The first 52 and second 54 side surfaces are spaced apart from one another and extend outwardly from the root surface 50 to the top surface 48. The thread 32 has a first worm pressure angle $\phi_{w1}$ and a second worm pressure angle $\phi_{w2}$. The first worm pressure angle $\phi_{w1}$ exceeds said second worm pressure angle $\phi_{w2}$. In one embodiment, the first worm pressure angle $\phi_{w1}$ is twice that of the second worm pressure angle $\phi_{w2}$, specifically, the first worm pressure angle $\phi_{w1}$ is sixty degrees and the second worm pressure angle $\phi_{w2}$ is 30 degrees. It should be understood that the first worm pressure angle $\phi_{w1}$ is not limited to being twice that of the second worm pressure angle $\phi_{w2}$, all that is necessary is that the first worm pressure angle $\phi_{w1}$ exceed the second worm pressure angle $\phi_{w2}$.

The worm gear 18 and the worm 20 each have a respective pitch diameter, $d_w$ and $d_g$, shown in FIG. 3A. The pressure angle represents the angle that the line of force makes with a line at right angles to the center line of the worm and worm gear at their pitch points. Said another way, the pressure angle is the angle between the tooth profile and a radial line at its pitch point.

FIGS. 3A and 3B show a double enveloping worm gear assembly. As shown in FIG. 3A, the worm 20 includes a length "l" along which the thread 32 extends. This length "l" has a first end 56, a second end 58, and a mid-point 60. In a double enveloping worm gear assembly the worm 20 is waisted such that it has a smaller diameter at the mid-point 60 than at the first 56 or second 58 ends. Thus, the worm 20 is hourglass shaped or curved along its length "l" so that it can envelop the worm gear 18.

As shown in FIG. 3B, the top surface 40 of each tooth 34 of the worm gear 18 is curved downwardly toward the root base 38 of the tooth 34. Thus the tooth 34 is narrower at its midpoint than at its ends. This allows the gear teeth 34 of the worm gear 18 to envelop the worm 20.

Figures 4A, 4B:
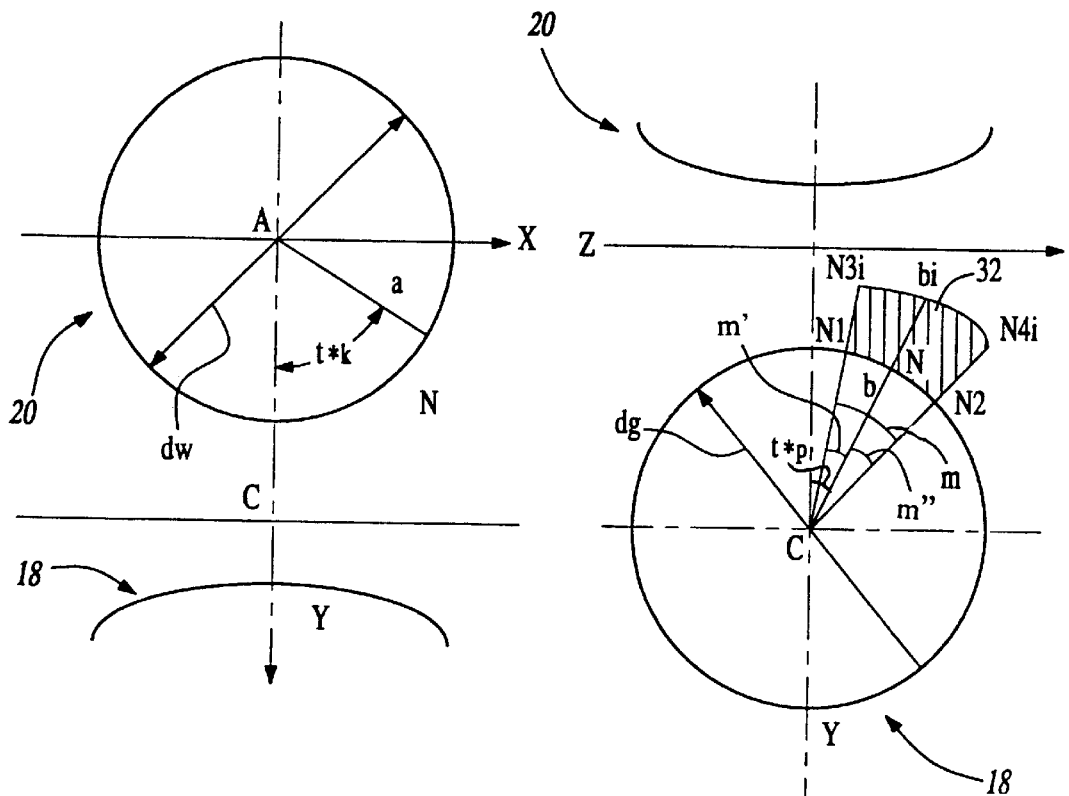
FIG. 4A is a cross sectional view of a worm thread in relation to a X, Y two-dimensional coordinate system.
FIG. 4B is a cross sectional view of a worm thread in relation to a Y, Z two-dimensional coordinate system.

FIGS. 4A and 4B show a cross sectional view of a worm thread 32 in relation to a X, Y, and Z coordinate system. FIG. 4A shows an X axis and a Y axis with the Z axis extending into the page. FIG. 4B shows a Z axis and a Y axis with the X axis extending into the page. The circle shown in FIG. 4A represents the pitch diameter $d_w$ of the worm 20 with the capital letter "A" representing the center of the worm and 'N' representing any point on the pitch diameter $d_w$. Thus, the pitch radius, represented by the lower case letter "a," of the worm 20 is defined by the length of the line AN. The angle between the line AN and the Y axis is represented by the quantity t*k. The letter "t" represents a variable from zero to one and the letter "k" represents a constant which is equal to three hundred sixty degrees divided by the number of threads. The capital letter "C" represents the center of the worm gear 18, thus the line AC represents the distance between the centers of the worm 20 and the worm gear 18.

The circle shown in FIG. 4B represents the pitch diameter $d_g$ of the worm gear 18 with the center "C" and "N" represents any point on the pitch diameter $d_g$. Thus, N is the point of contact between the worm 20 and the worm gear 18 at their respective pitch diameters $d_w$, $d_g$. The worm gear pitch radius "b" is therefore equivalent to the length of the line CN.

The cross hatched portion of FIG. 4B is a cross sectional view of the worm thread 32. The thread 32 has a first surface N1 to N3$^i$, a second surface N2 to N4$^i$, a third surface N1 to N2, and a fourth surface N3$^i$ to N4$^i$. While "b" represents the pitch radius of the worm gear 18, the letters "b$^i$" represents a greater radial distance than "b." Thus, the third surface N1 to N2 is along the pitch diameter $d_g$ at a distance "b" from the center "C" of the worm gear 18 while the fourth surface N3$^i$ to N4$^i$ is along the diameter defined by the radius "b$^i$." The angle between the radial line defined by b$^i$ and the Y axis is represented by the quantity t*p, and the angle between CN3$^i$ and CN4$^i$ is represented by the letter "m" wherein "m" is the sum of the angle m' and the angle m". The angle m' is defined as the angle between lines Cb$^i$ and CN3$^i$ and the angle m" is defined as the angle between lines Cb$^i$ and CN4$^i$.

The cross sectional portion of the thread 32 can be defined by equations for curve N1, equations for curve N2, equations for curve N3$^i$, and equations for curve N4$^i$. The curves N1, N2, N3$^i$, and N4$^i$, as shown in FIG. 4B, represent curves that extend into the page, i.e. along the Z axis. Curve N1 is defined by the equations X1=(AC-(b * cos(t * p-m')))*sin(t*k)

Y1=(AC-(b * cos(t * p-m')))*cos(t*k)

Z1=b*sin(t* p-m').

Curve N2 is defined by the equations

X2=(AC-(b *cos(t * p+m")))*sin(t*k)

Y2=(AC-(b * cos(t * p+m")))*cos(t*k)

Z2=b*sin(t* p+m").

Curve N3$^i$ is defined by the equations

X3=(AC-(b$^i$*cos(t * p-m')))*sin(t*k)

Y3=(AC-(b$^i$*cos(t * p-m')))*cos(t*k)

Z3=b$^i$*sin(t* p-m').

Curve N4$^i$ is defined by the equations

X4=(AC-(b$^i$*cos(t * p+m")))*sin(t*k)

Y4=(AC-(b$^i$ * cos(t * p+m")))*cos(t*k)

Z4=b$^i$*sin(t* p+m").

The equations for these coordinates (X1, Y1, Z1), (X2, Y2, Z2), (X3, Y3, Z3), and (X4, Y4, Z4) represent a three dimensional coordinate for the first N1, second N2, third N3$^i$, and fourth N4$^i$ curves respectively. As discussed above, AC represents the distance between the center for the worm 20 and the center for the worm gear 18, "t*p" represents the angle between the radial line defined by "b$^i$" and the Y axis, "m" represents the angle between CN3 and CN4, "b" represents the pitch radius of the worm gear 18, and "b$^i$" represents a radial distance greater than "b." The letter "t" represents a variable from zero to one, "p" is equal to "k" divided by the number of teeth 34 on the worm gear 18, m' and m" represent angles of a tooth 34 on the worm gear 18, and "k" is equal to three hundred sixty degrees divided by the number of threads.

Additionally, in one embodiment the number of gear teeth 34 on the worm gear 18 is less than twenty four. In the preferred embodiment the number of gear teeth 34 on the worm gear 18 is less than eleven. In the prior art, the number of gear teeth 34 on the worm gear 18 has been greater than twenty four. This limitation is determined by the current capabilities of gear manufacturing machines and processes. However, as improvements are made in this area of manufacturing, it will be possible to manufacture a worm gear 18 with less than twenty four teeth 34 and possible with less than eleven teeth 34. It is desirable to decrease the number of teeth 34 on the worm gear 18 because it increases the overall efficiency of the worm gear assembly.

It should be understood that the subject invention is not limited to a worm gear with 18 less than twenty-four gear teeth 34, i.e., the invention relates to one of the pressure angles of the worm and/or worm gear exceeding the other pressure angle. Thus, the worm gear can have more than twenty four teeth and include a first worm gear pressure angle which exceeds a second worm gear pressure angle. The reduction of teeth is an additional benefit to increasing the efficiency of the worm gear assembly.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A drive axle assembly comprising:
   first and second driven wheels;
   first and second axle shafts for driving said first and second wheels respectively, said first and second axle shafts defining a first axis of rotation;
   a worm gear for driving said first and second axle shafts and rotatable about said first axis of rotation, said worm gear having teeth defined by a tooth profile having a first worm gear pressure angle and a second worm gear pressure angle wherein said first worm gear pressure angle is twice said second worm gear pressure angle;
   a worm for driving said worm gear and defining a second axis of rotation substantially perpendicular to said first axis of rotation, said worm including at least one thread having a worm thread profile with a first worm pressure angle and a second worm pressure angle wherein said first worm pressure angle is twice said second worm pressure angle; and
   an input shaft for driving said worm, said input shaft rotating about said second axis of rotation.

2. A drive axle assembly as set forth in claim 1 wherein said tooth profile of said worm gear includes a curvilinear top surface for enveloping said worm.

3. A drive axle assembly as set forth in claim 2 wherein said tooth profile of said worm gear has a root base, a drive side, and a coast side, said drive and coast sides extending upwardly from said root base to said top surface.

4. A drive axle assembly as set forth in claim 3 wherein said first worm gear pressure angle is located at said drive side and said second worm gear pressure angle is located at said coast side.

5. A drive axle assembly as set forth in claim 2 wherein said worm includes a length along which said thread extends, said length having a first end, a second end, and a mid-point and wherein said worm has a smaller diameter at said mid-point than at said first or second ends for enveloping said worm gear.

6. A drive axle assembly as set forth in claim 1 wherein said first worm pressure angle is sixty degrees and said second worm pressure angle is thirty degrees and said first worm gear pressure angle is sixty degrees and said second worm gear pressure angle is thirty degrees.

7. A drive axle assembly as set forth in claim 1 wherein said thread of said worm is defined by a first curve, a second curve, a third curve, and a fourth curve, wherein said first curve is defined by the equations $$X1=(AC-(b * \cos(t * p-m')))*\sin(t*k)$$

$$Y1=(AC-(b * \cos(t * p-m')))*\cos(t*k)$$

$$Z1=b*\sin(t* p-m'),$$

said second curve is defined by the equations $$X2=(AC-(b *\cos(t * p+m'')))*\sin(t*k)$$

$$Y2=(AC-(b * \cos(t * p+m'')))*\cos(t*k)$$

$$Z2=b*\sin(t* p+m''),$$

said third curve is defined by the equations $$X3=(AC-(b^{i}*\cos(t * p-m')))*\sin(t*k)$$

$$Y3=(AC-(b^{i}* \cos(t * p-m')))*\cos(t*k)$$

$$Z3=b^{i}*\sin(t* p-m'),$$

and said fourth curve is defined by the equations $$X4=(AC-(b^{i}*\cos(t * p+m'')))*\sin(t*k)$$

$$Y4=(AC-(b^{i}* \cos(t * p+m'')))*\cos(t*k)$$

$$Z4=b^{i}*\sin(t* p+m''),$$

wherein (X1, Y1, Z1), (X2, Y2, Z2), (X3, Y3, Z3), and (X4, Y4, Z4) represent a three dimensional coordinate for the first, second, third, and fourth curves respectively, AC represents a distance between a center for said worm and a center for said worm gear, b represents the pitch radius of said worm gear, t represents a variable from zero to one, p is equal to k divided by the number of said teeth on said worm gear, m' and m" represent angles of a tooth on said worm gear, k is equal to three hundred sixty degrees divided by the number of threads on said worm, and b$^i$ represents a distance greater than b.

8. A worm gear assembly for a drive axle comprising:
   a worm gear rotatable about a first axis of rotation, said worm gear having teeth defined by a tooth profile having a first worm gear pressure angle and a second worm gear pressure angle wherein said first worm gear pressure angle twice said second worm gear pressure angle; and a worm for driving said worm gear and defining a second axis of rotation substantially perpendicular to said first axis of rotation, said worm including at least one thread having a worm thread profile with a first worm pressure angle and a second worm pressure angle wherein said first worm pressure angle is twice said second worm pressure angle.

9. A worm gear assembly as set forth in claim 8 wherein said thread of said worm is defined by a first curve, a second curve, a third curve, and a fourth curve, wherein said first curve is defined by the equations $$X1=(AC-(b *\cos(t * p-m')))*\sin(t*k)$$

$$Y1=(AC-(b * \cos(t * p-m')))*\cos(t*k)$$

$$Z1=b*\sin(t* p-m'),$$

said second curve is defined by the equations $$X2=(AC-(b *\cos(t * p+m'')))*\sin(t*k)$$

$$Y2=AC-(b * \cos(t * p+m'')))*\cos(t*k)$$

$$Z2=b*\sin(t*p+m''),$$

said third curve is defined by the equations $$X3=(AC-(b^{i}*\cos(t * p-m')))*\sin(t*k)$$

$$Y3=(AC-(b^{i}* \cos(t * p-m')))*\cos(t*k)$$

$$Z3=b^{i}*\sin(t* p-m'),$$

and said fourth curve is defined by the equations $$X4=(AC-(b^{i}*\cos(t * p+m'')))*\sin(t*k)$$

$$Y4=(AC-(b^{i} * \cos(t * p+m')))*\cos(t*k)$$

$$Z4=b^{i}*\sin(t* p+m''),$$

wherein (X1, Y1, Z1), (X2, Y2, Z2), (X3, Y3, Z3), and (X4, Y4, Z4) represent a three dimensional coordinate for the first, second, third, and fourth curves respectively, AC represents a distance between a center for said worm and a center for said worm gear, b represents the pitch radius of said worm gear, t represents a variable from zero to one, p is equal to k divided by the number of said teeth on said worm gear, m' and m" represent angles of a tooth on said worm gear, k is equal to three hundred sixty degrees divided by the number of threads on said worm, and $b^i$ represents a distance greater than b.

10. A worm gear assembly as set forth in claim 8 wherein said tooth profile of said worm gear includes a curvilinear top surface for enveloping said worm.

11. A worm gear assembly as set forth in claim 10 wherein said tooth profile of said worm gear has a root base, a drive side, and a coast side, said drive and coast sides extending upwardly from said root base to said top surface.

12. A worm gear assembly as set forth in claim 11 wherein said first worm gear pressure angle is located at said drive side and said second worm gear pressure angle is located at said coast side.

13. A worm gear assembly as set forth in claim 10 wherein said worm includes a length along which said thread extends, said length having a first end, a second end, and a mid-point and wherein said worm has a smaller diameter at said mid-point than at said first or second ends for enveloping said worm gear.

14. A worm gear assembly as set forth in claim 8 wherein said worm gear includes less than twenty four teeth.

15. A worm gear assembly for a drive axle comprising:

a worm gear rotatable about a first axis of rotation, said worm gear having teeth defined by a tooth profile having a first worm gear pressure angle and a second worm gear pressure angle wherein said first worm gear pressure angle exceeds said second worm gear pressure angle; and a worm for driving said worm gear and defining a second axis of rotation substantially perpendicular to said first axis of rotation, said worm including at least one thread having a worm thread profile with a first worm pressure angle and a second worm pressure angle wherein said first worm pressure angle exceeds said second worm pressure angle;

said thread of said worm being defined by a first curve, a second curve, a third curve, and a fourth curve, wherein said first curve is defined by the equations $$X1=(AC-(b *\cos(t*p-M')))*\sin(t*k)$$

$$Y1=(AC-(b * \cos(t * p-M')))*\cos(t*k)$$

$$Z1=b*\sin(t* p-M'),$$

said second curve is defined by the equations $$X2=(AC-(b *\cos(t * p+M'')))*\sin(t*k)$$

$$Y2=AC-(b * \cos(t * p+M'')))*\cos(t*k)$$

$$Z2=b*\sin(t*p+M''),$$

said third curve is defined by the equations $$X3=(AC-(b^{i}*\cos(t * p-M')))*\sin(t*k)$$

$$Y3=(AC-(b^{i}* \cos(t * p-M')))*\cos(t*k)$$

$$Z3=b^{i}*\sin(t* p-M'),$$

and said fourth curve is defined by the equations $$X4=(AC-(b^{i}*\cos(t * p+M'')))*\sin(t*k)$$

$$Y4=(AC-(b^{i}*\cos(t * p+M'')))*\cos(t*k)$$

$$Z4=b^{i}*\sin(t* p+M''),$$

wherein (X1, Y1, Z1), (X2, Y2, Z2), (X3, Y3, Z3), and (X4, Y4, Z4) represent a three dimensional coordinate for the first, second, third, and fourth curves respectively, AC represents a distance between a center for said worm and a center for said worm gear, b represents the pitch radius of said worm gear, t represents a variable from zero to one, p is equal to k divided by the number of said teeth on said worm gear, M' and M" represent angles of a tooth on said worm gear, k is equal to three hundred sixty degrees divided by the number of threads on said worm, and $b^i$ represents a distance greater than b.

* * * * *